United States Patent [19]

Lewis

[11] E Re. 31,533

[45] Reissued Mar. 6, 1984

[54] INFORMATION CARRYING DISCS

[75] Inventor: Terry W. Lewis, Woodbury, Minn.

[73] Assignee: Minnesota Mining and Manufacturing Company, Saint Paul, Minn.

[21] Appl. No.: 446,635

[22] Filed: Dec. 3, 1982

Related U.S. Patent Documents

Reissue of:

[64] Patent No.: 4,296,158
Issued: Oct. 20, 1981
Appl. No.: 117,466
Filed: Feb. 1, 1980

[51] Int. Cl.[3] ..... B32B 3/02

[52] U.S. Cl. ..... 428/65; 360/135; 427/54.1; 428/162; 428/163; 525/908; 526/262; 526/263; 544/314; 548/307; 548/312

[58] Field of Search ..... 428/65, 162, 163; 360/135; 427/54.1; 525/908; 526/262, 263; 544/314; 548/307, 312

[56] References Cited

U.S. PATENT DOCUMENTS

| | | | |
|---|---|---|---|
| 3,658,954 | 4/1972 | Broadbent | 264/1 |
| 3,795,534 | 3/1974 | Mehalso et al. | 117/101 |
| 3,798,134 | 3/1974 | Hynes | 204/6 |
| 3,808,226 | 4/1974 | Habermeier et al. | 260/309.5 |
| 3,821,098 | 6/1974 | Garratt et al. | 204/159.22 |
| 3,855,426 | 12/1974 | Bouwhuis | 179/100.3 V |
| 3,901,994 | 8/1975 | Mehalso et al. | 428/163 |
| 4,006,271 | 2/1977 | French et al. | 427/164 |
| 4,049,861 | 9/1977 | Nozari | 428/220 |
| 4,101,513 | 7/1978 | Fox et al. | 526/193 |
| 4,126,726 | 11/1978 | Soeding | 428/163 |
| 4,130,620 | 12/1978 | Jarsen | 264/225 |
| 4,157,931 | 6/1979 | Bricot et al. | 156/230 |
| 4,161,588 | 7/1979 | Green et al. | 542/432 |
| 4,249,011 | 2/1981 | Wendling | 548/312 |
| 4,262,072 | 4/1981 | Wendling et al. | 430/14 |

FOREIGN PATENT DOCUMENTS

| | | |
|---|---|---|
| 859711 | of 0000 | Belgium . |
| 2519476 | 12/1977 | Fed. Rep. of Germany . |

*Primary Examiner*—Thurman K. Page
*Attorney, Agent, or Firm*—Donald M. Sell; James A. Smith; Mark A. Litman

[57] ABSTRACT

Information-carrying discs are comprised of a substrate having an information bearing layer derived from 15 to 100% by weight of at least one polyacryloyl-containing heterocyclic monomer.

16 Claims, No Drawings

INFORMATION CARRYING DISCS

Matter enclosed in heavy brackets [ ] appears in the original patent but forms no part of this reissue specification; matter printed in italics indicates the additions made by reissue.

FIELD OF THE INVENTION

The present invention relates to information carrying systems and more particularly to discs which carry light readable or stylus readable information. These discs may be useful in carrying information which is convertible to electronic signals for such varied uses as sound recordings, audio/visual recordings, or even computer type information retrieval.

BACKGROUND OF THE INVENTION

Information retrieval in the form of discs having information distributed in a circular or spiral pattern has been available in various forms for many years. Early forms of musical reproduction equipment, for example, used discs with either holes or protuberances to pluck an array of strings or vibrating posts to produce music. Early displays of moving pictures operated by rotation of a disc bearing consecutive images on the periphery. The most common form of storing reproductions of musical performances, which has been in use for about one hundred years, is the phonograph record which uses a spiral pattern of grooves having vertical and horizontal modulations to generate signals which can be converted to sound.

With the introduction of the laser to industry, a new information storage system was developed which comprised a disc having circular or spiral patterns of depressions or protuberances which would disturb, reflect, or refract incident light patterns. These information storing discs, often used for storage of audio/visual information and generally referred to as video discs, are well known in the art. Such U.S. Pat. Nos. as 3,658,954 (Apr. 25, 1972); 3,795,534 (Mar. 5, 1974); 3,798,134 (Mar. 19, 1974); 3,855,426 (Dec. 17, 1974); 3,901,994 (Aug. 26, 1975); 4,124,672 (Nov. 7, 1978); 4,126,716 (Nov. 21, 1978); and 4,130,620 (Dec. 19, 1978) shown various constructions, compositions, and processes for forming video discs.

In addition to the laser readable video disc, another commercial construction is used which is more similar to the classic phonograph recording. This type of construction, as described in RCA Review, Vol. 39, No. 1, March 1978, comprises a spiral array of grooves which is tracked by a stylus. The grooves are impressed with coded information in the form of vertical and/or radial modulations.

Even though these systems are read by totally different techniques, they are affected by similar, if not identical, problems. Imperfections in the depressions, protuberances, or modulations cause undesirable or spurious signals to be transmitted. The imperfections can be produced during manufacture of the disc or can develop from wear during use or manipulation of the disc.

The present invention relates to information storage discs for use with laser or stylus readout systems which have good fidelity and resistance to wear.

SUMMARY OF THE INVENTION

It has been found according to the present invention that information storage devices comprising disc blanks or discs having a circular or spiral pattern of depressions, protuberances and/or grooves, with or without modulations, can be constructed from a substrate having as the information carrying layer on at least one surface thereof a layer formed from a composition comprised of from 15-100% by weight of a polyacryloyl containing heterocyclic compound. At least 15% by weight is needed for curing in the presence of oxygen and at least 30% by weight is needed for abrasion resistance. These heterocyclic compounds are the subject matter of commonly assigned U.S. Pat. Nos. 3,821,098 and 3,808,226 and U.S. patent application Ser. Nos. 51,876 (filed June 25, 1979) now U.S. Pat. No. 4,249,011, 51,877 (filed June 25, 1979) and 51,888 (filed June 25, 1979).

DETAILED DESCRIPTION OF THE INVENTION

The polyacryloyl containing heterocyclics are defined according to the present invention as materials described by the formulae:

$$A^1—Z—A^2 \qquad (1)$$

wherein $A^1$ and $A^2$ independently are alkoxyalkyl groups having terminal ethylenic unsaturation and having the formula

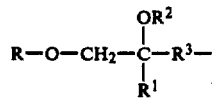

wherein R—O— is a monovalent residue of an aliphatic terminally unsaturated primary alcohol, ROH, formed by the removal of the active hydrogen from the primary —OH group, R having the formula:

$$[E\text{-}(CH_2)\text{-}_b]_m R^5\text{-}(CH_2)\text{-}_c$$

wherein

E is

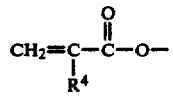

c is an integer of from 1 to 6, b is zero or an integer of from 1 to 6, $R^1$ and $R^4$ are independently selected from hydrogen and methyl, $R^5$ is an aliphatic group having from 1 to 15 carbon atoms, and no more than two non-adjacent catenary oxygen or carboxy groups, a valence of M+1, m is an integer of from 1 to 5, $R^2$ is selected from hydrogen and groups of the formula

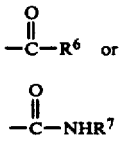

wherein $R^6$ is selected from alkyl and alkenyl groups $R^7$ is an aliphatic or aromatic group of up to eight carbon atoms, $R^3$ is an alkylene group of from 1 to 6 carbon atoms with up to one catenary oxygen atom, and z is a heterocyclic group of the formula

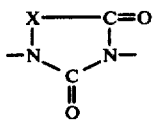

wherein x is a divalent group which is required to complete a 5- or 6-membered heterocyclic ring, or

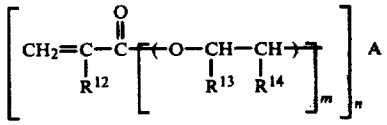

(2)

wherein $R^{12}$ and $R^{13}$ independently represent hydrogen or methyl, $R^{14}$ represents hydrogen, an alkyl group, or a phenyl group, $R^{13}$ and $R^{14}$ together may represent a trimethylene or tetramethylene group, m represents a number of from 1 to 30, n is 2 or 3, and A represents a group of the formula

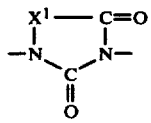

wherein $X^1$ represents the divalent radical necessary to complete a 5- or 6- membered heterocyclic ring group. The preferred classes of these materials are (a) from formula (1):

wherein X is selected from

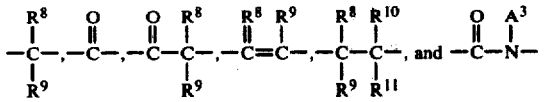

wherein $R^8$, $R^9$, $R^{10}$ and $R^{11}$ are independently hydrogen, alkyl group of 1 to 4 carbon atoms, cycloalkyl group of 3 to 6 carbon atoms, and aryl group (e.g., phenyl group) of 6 to 12 carbon atoms, and $A^3$ is an alkoxyalkyl group a defined for $A^1$ and $A^2$, and (b) from formula (2):

wherein m is from 1 to 4, and $X^1$ is selected from

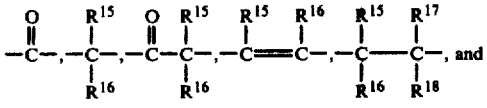

-continued

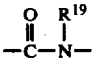

wherein $R^{15}$, $R^{16}$, $R^{17}$ and $R^{18}$ independently represent hydrogen, an alkyl group, an alkylene group, a cycloalkyl group, or a phenyl group, and $R^{19}$ represents hydrogen, an aliphatic group, or an aromatic group.

It is more preferred, with regard to the preferred compounds of formula (1) that $R^2$ be hydrogen, that X be

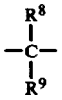

and $R^8$ and $R^9$ be hydrogen or alkyl of 1 to 4 carbon atoms, that m be 2 to 5, that R be $[(CH_2)_b]_mR^5(CH_2)_c$, that $R^5$ be alkylene of 1 to 15 carbon atoms, and/or that $R^4$ be hydrogen. It is more preferred with regard to formula (2) that $X^1$ be selected from

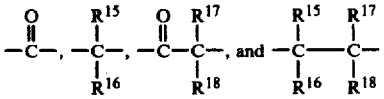

and that $R^{15}$, $R^{16}$, $R^{17}$, and $R^{18}$ be independently selected from hydrogen, alkyl of 1 to 4 carbon atoms, alkylene of 1 to 4 carbon atoms and phenyl. Most preferably $R^{15}$–$R^{18}$ are selected from hydrogen and alkyl of 1 to 4 carbon atoms.

As noted above, the information bearing layer of the disc blanks or discs of the present invention must be formed from a polymeric resin derived from a composition comprising at least 15% by weight of the polyacryloyl heterocyclics. The heterocyclics may of course constitute 100% by weight of reactive or polymeric components in the resin. The compositions used in the process of the present invention may be diluted with up to 85% by weight of any ethylenically unsaturated monomer. Preferably the majority of comonomers are at least diethylenically unsaturated monomers. Generic classes include the acrylates, methacrylates, acrylic anhydrides, ethylenically unsaturated anhydrides, olefinic compounds, acrylamides, ethylenically unsaturated amides and urethanes, vinyl esters, vinyl ethers, vinyl halides, vinyl epoxy resins, vinyl silanes and siloxanes, vinyl heterocyclics, and prepolymers and polymers of these materials. Particularly suitable ethylenically unsaturated monomers include methyl methacrylate, ethyl acrylate, 2-ethylhexyl acrylate, cyclohexyl acrylate, styrene, butadiene, 2-chlorostyrene, 2,4-dichlorostyrene, acrylic acid, acrylamide, acrylonitriles, t-butyl acrylate, methyl acrylate, butyl acrylate, N-vinyl pyrrolidone, 2-(N-butylcarbamyl)ethyl methacrylate and 2-(N-butyl-carbamyl)ethyl methacrylate, and 2-(N-ethylcarbamyl)ethyl methacrylate. Preferably 35 to 80% and most preferably 45 to 60% by weight of copolymerizable components comprise the heterocyclic agents of the present invention. Other diluting monomers that can be incorporated into the composition of the invention include 1,4-butylene dimethacrylate or acrylate, ethylene dimethacrylate, hexamethylene diacrylate (hexanediol diacrylate) or dimethacrylate, glyceryl diacrylate or methacrylate, glyceryl triacrylate or trimethacrylate, pentaerythritol triacrylate or trimethacrylate, pentaerythritol tetraacrylate or tetramethacrylate, diallyl phthalate, dipentaerythritol pentaacrylate, neopentylglycol triacrylate and 1,3,5-tri(2-methacryloxyethyl)-s-triazine.

The compositions should also contain polymerization or free radical initiators in order to provide more photosensitivity to the system to speed up the cure. Polymerization initiators suitable for use in the compositions of the invention are compounds which liberate or generate a free-radical on addition of energy. Such initiators include peroxy, azo, and redox systems each of which are well known and are described frequently in polymerization art, e.g. Chapter II of Photochemistry, by Calvert and Pitts, John Wiley and Sons (1966). Included among free-radical catalysts are the conventional heat activated catalysts such as organic peroxides and organic hydroperoxides; examples are benzoyl peroxide, tertiarybutyl perbenzoate, cumene hydroperoxide, azobis(isobutyronitrile) and the like. The preferred initiators are photopolymerization initiators which facilitate polymerization when the composition is irradiated. Included among such initiators are acyloin and derivatives thereof, such as benzoin, benzoin methyl ether, benzoin ethyl ether, benzoin isopropyl ether, benzoin isobutyl ether, and α-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbamate; phenones such as acetophenone, α,α,α-tribromoacetophenone, α,α-diethoxyacetophenone, 2,2-dimethoxy-2-phenylacetophenone, o-nitro-α,α,60-tribomacetophenone benzophenone, and p,p'-tetramethyldiaminobenzophenone; aromatic iodonium and aromatic sulfonium salts; sulfonyl halides such as p-toluenesulfonyl chloride, 1-nahthalenesulfonyl chloride, 2-naphthalenesulfonyl chloride, 1,3-benzenedisulfonyl chloride, 2,4-dinitrobenzenesulfonyl bromide and p-acetamido-benzenesulfonyl chloride. Normally the initiator is used in amounts ranging from about 0.01 to 5% by weight of the total polymerizable composition. When the quantity is less than 0.01% by weight, the polymerization rate becomes extremely low. If the initiator is used in excess of 5% by weight, no correspondingly improved effect can be expected.

Other additives may be usefully included in the compositions and resins used in the practice of the present invention. Conventional materials such as antioxidants, lubricants, surface active agents, antistatic agents, flow control aids, dyes, pigments, etc. may be useful ingredients depending upon the ultimate use of the disc blank or disc.

The structure of the information carrying discs of the present invention comprises a substrate having the information impressed or blank groove impressed polyacryloyl containing heterocyclic coating layer on at least one side thereof. The substrate may be substantially any solid material, including but not limited to polymeric materials such as polyesters, polycarbonates, polyacrylates, polyurethanes, polyvinyl resins, polyesters, polyamides, and polysiloxanes; ceramic or glass materials; fibrous materials; metals; etc. The backing may be transparent or opaque depending upon the readout system used. If the backing is opaque to the curing radiation, a stamper which is substantially transparent to the curing radiation must be used. Primer layers may be used between the substrate and the information carrying layer, but this is not essential, depending upon the adhesion of the polymer to the substrate. The substrate may be of any thickness, but is usually from 50 to 5000 μm. The information carrying layer is critical in its dimensions and must be between 1 and 25 μm for a video disc and up to 100 μm for an audio disc in its maximum thickness. The term maximum thickness is used, because the layer, having depressions, protuberances, or grooves thereon, varies in thickness. This limit therefore applies to the maximum thickness of the layer.

The information is encoded on the information carrying layer as depressions, protuberances, and/or grooves with or without arc-like (e.g., semicircular, hyperbolic, etc.) modulations in either a circular, or spiral pattern on the layer. The depth or height of the information carrying deformity from the plane of the surface or the mean height of the surface is normally between 0.03 to 5 μm. In laser readout systems, this dimension is usually between 0.03 and 2 μm, preferably between 0.05 and 0.8 μm, and more preferably between 0.07 and 0.5 μm. In stylus readout systems, this dimension is usually between 0.05 and 5 μm, preferably between 0.08 and 2 μm, and more preferably between 0.10 and 1.0 μm. For an LP record, this dimension is preferably between 25 and 75 μm. The width (peak to peak) between grooves in audio systems is about 60–80 μm.

The light read systems may have a metallized coating over the information carrying surface and another polymer layer, preferably of an abrasion resistant material, over the metal layer, if a reflective rather than transmissive readout system is being used. These coatings can be laid by a variety of manners including vapor deposition or reduction of metal salt solutions.

Alternatively, two reflectivity metallized discs may be adhesively secured together so that the two information bearing surfaces are sandwiched in the middle of the composite and information is then read reflectively through a transparent substrate.

Capacitively read discs may have a metallized coating applied to the replicated information bearing surface to provide electrical conductivity. The metallized coating may then be provided with an electrically insulative overlayer.

Replicas to be read with a stylus may also use a lubricant or lubricating layer on the information bearing surface to minimize stylus wear.

Preferably the information is encoded into the information carrying layer in a spiral pattern rather than a circular pattern so that the reading element can follow a single path rather than having to shift from one concentric circle to another.

If the information carrying layer is to be penetrated by light during readout, it must be transmissive of the reading radiation. Ordinarily a fairly narrow band of radiation is used to read the discs so that information carrying layer may have to be transmissive of at least 50% of the radiation in a 100 nm, 50 nm, or even 30 nm band. Preferably the layer is transmissive of at least 75 to 90% of the radiation within such a band.

One other important aspect of the present invention is that the low applied pressures and low temperatures associated with the use of liquid compositions allows for the use of non-metallic stampers and masters.

These and other aspects of the present invention will be shown in the following examples.

EXAMPLE 1

A resin composition was prepared by mixing 60 gms of 1,3-bis{3-[2,2,2-(triacryloyloxymethyl)ethoxy]-2-hydroxypropyl}-5,5-dimethyl-2,4-imidazolidinedione (hereinafter referred to as Compound A) containing about 25% by weight of pentaerythritol tetraacrylate, 40 gms of 1,6-hexanediol diacrylate and 2 gms of 2,2-dimethoxy-2-phenyl-acetophenone. This composition was mixed by shaking and then filtered through a 5 μm filter. The resulting photopolymerizable material was used to make a video disc with a nickel video disc stamper.

Approximately 2.0 $cm^3$ of this photopolymerizable liquid material was spread by a cylindrical coating roller between a nickel video disc stamper and a primed 0.18 mm polyester film. The sheet of polyester film was positioned between the roller and the stamper to serve as the base substrate. The rolling process spread out a bubble free coating of photopolymerizable resin over the surface of the stamper and simultaneously covered it with the polyester sheet. The stamper covered in this manner was then passed several times at 3 cm/sec under a 200 watt/inch high intensity, medium pressure Hg vapor lamp. The ultraviolet radiation exposure cured the photopolymerizable liquid, hardening it and bonding it to the primed polyester film. After the exposure, the laminated structure containing the replicated information was easily peeled from the nickel stamper. The sheet was then cut to produce a circular center hole and a circular outside shape, both concentric with the replicated information tracks. The resulting video disc replica had an information bearing layer 10±5 μm thick. The disc lay flat when placed on a level surface. It provided a good television picture when played on a video disc player.

EXAMPLE 2

A video recording was made in a comercially available polymeric photoresist layer and the layer developed by standard wash-development techniques after exposure to light. The recording was then vapor coated with 10 nm of chrome. The resulting photoresist master was used in place of a nickel stamper to make a video disc replica according to the procedures of example 1. This replica was capable of producing a good television picture when played on a video disc player and was also useful as a stamper for repeated replications.

EXAMPLE 3

A resin composition was prepared by mixing 70 gm of Compound A with 30 gm of hexanediol diacrylate and 2 gm of the photoinitiator of Example 1. The resulting material was used to make a video disc according to the procedure of Example 1. The video disc replica made in this way had a cured information bearing layer 6±2 μm thick. This disc lay flat when placed on a level surface. It provided a good television picture when played on a video disc player.

EXAMPLE 4

A resin composition was prepared by mixing 30 gm of Compound A with 70 gm of hexanediol diacrylate and 2 gm of the photoinitiator of Example 1. The resulting material was used to make a video disc according to the procedure of Example 1. The video disc replica made in this way had a cured information bearing layer 5±2.5 μm thick. This disc lay flat when placed on a level surface. It provided a good television picture when played on a video disc player.

EXAMPLE 5

A sample of commercially available polyvinylchloride film 14 inches square was prepared for use as a video disc substrate in the following way. The sheet was placed between two flat, smooth, chrome-steel plates. The plates were in turn sandwiched between four layers of cardboard and the resulting stack pressed for ten minutes in a hydraulic press. The press was operated with a force of 11 metric tons, and the press platens were heated to 160° C. This pressing operation reduced the surface roughness of the manufactured film and provided a substrate of suitable flatness.

The substrate thus prepared was used to make a video disc replica according to the procedure of Example 1, except that the surface of the polyvinylchloride opposite the information bearing layer was also coated with the resin composition. The cured polymer showed good adhesion to the otherwise untreated surface of the polyvinylchloride substrate. The disc lay flat when placed on a level surface and provided a good television picture when played on a video disc player. Information was read from this disc with the laser beam incident from either side of the disc.

EXAMPLE 6

A sheet of cast acrylic material (polymethylmethacrylate) 1000 μm thick was sputter etched according to the following procedure to promote adhesion of the polymer. The acrylic substrate was placed in a Vecco Model 776 radio frequency diode sputtering apparatus operating at a frequency of 13.56 MHz. The substrate was then subjected to a radio frequency sputter etch as described in assignee's copending application Ser. No. 80,530, filed Oct. 10, 1979.

The resin composition of Example 1 and the roll coating technique of Example 1 was used to prepare a video disc replica with the above described substrate. The semi-flexible substrate was allowed to bend slightly when it was lowered slowly onto the stamper as the roller moved along. The resin composition was cured with a bank of low intensity UV lamps, and the replica removed from the stamper. An aluminum coating 30 nm thick was vapor coated onto the surface of the information bearing layer. A circular hole was cut in the center of the disc, and a circular outer edge was cut. The resulting disc was then played on a video disc player; a good television picture was obtained. The laser beam of the player was incident through the uncoated acrylic surface and reflected by the aluminum coating on the information bearing surface.

EXAMPLE 7

An audio record replica was prepared using commercially available 1 mm polyvinylchloride as the base element. The resin composition of Example 1 was used within the roll-coating technique of Example 1. The semi-flexible base element was allowed to bend slightly as it was lowered slowly on to the audio record stamper as roller moved along. The resin composition was cured to 75 μm maximum thickness by several passes at 3 cm/sec. under a 200 watt/inch high intensity, medium pressure Hg vapor lamp. The replica was then stripped from the stamper. A circular hole was cut in the center of the record and a circular outer edge was cut. The resulting replica was successfully played on a conventional stereo audio system.

I claim:

1. An information-carrying element comprising a substrate having adhered to at least one surface thereof a separate layer having a maximum thickness of from 1.0 to 100 μm and a circular or spiral pattern of grooves with or without modulations, depressions, protuberances, said separate layer comprising a polymer layer derived from 15 to 100% by weight of at least one polyacryloyl-containing heterocyclic wherein said heterocyclic is selected from the formulae:

$$A^1—Z—A^2 \qquad (1)$$

wherein $A^1$ and $A^2$ independently are alkoxyalkyl groups having terminal ethylenic unsaturation and having the formula

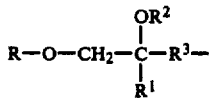

wherein R—O— is a monovalent residue of an aliphatic terminally unsaturated primary alcohol, ROH, formed by the removal of the active hydrogen from the primary —OH group, R having the formula:

$$[E\text{-}(CH_2)_b\text{-}]_m R^5\text{-}(CH_2)_c$$

wherein E is

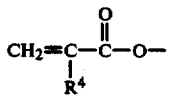

*b is zero or an integer of from 1 to 6,* c is an integer of from 1 to 6, $R^1$ and $R^4$ are independently selected from hydrogen and methyl, $R^5$ is an aliphatic group having from 1 to 15 carbon atoms, and no more than two catenary oxygen or carboxy groups, a valence of m+1.

m is an integer of from 1 to 5, $R^2$ is selected from hydrogen and groups of the formula

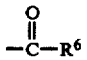

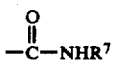

wherein $R^6$ is selected from alkyl and alkenyl groups $R^7$ is an aliphatic or aromatic group of up to eight carbon atoms, $R^3$ is an alkylene group of from 1 to 6 carbon atoms with up to one catenary oxygen atom, and Z is a heterocyclic group of the formula

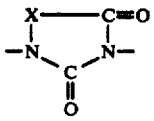

wherein X is a divalent group which is required to complete a 5- or 6-membered heterocyclic ring, or

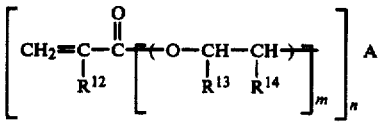

(2)

wherein $R^{12}$ and $R^{13}$ independently represent hydrogen or methyl, $R^{14}$ represents hydrogen, an alkyl group, or a phenyl group, $R^{13}$ and $R^{14}$ together may represent trimethylene or tetramethylene group, m represents a number of from 1 to 30, n is 2 or 3, and A represents a group of the formula

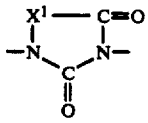

wherein $X^1$ represents the divalent radical necessary to complete a 5- or 6-membered heterocyclic ring group [, said process comprising exposing said composition to radiation while the composition is in the presence of an atmosphere of at least 2% by volume of oxygen to polymerize said components having formula (1) or (2)].

2. The element of claim 1 wherein said polymer layer was derived from 30 to 100% by weight of at least one polyacryoyl containing heterocyclic.

3. The element of claim 1 wherein said heterocyclic is selected from formula (2), m is 1 to 4, and $X^1$ is selected from

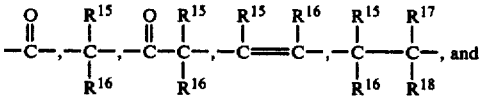

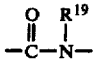

wherein $R^{15}$, $R^{16}$, $R^{17}$ and $R^{18}$ independently represent hydrogen, an alkyl group, and alkylene group, a cycloalkyl group, or a phenyl group, and $R^{19}$ represents hydrogen, an aliphatic group, or an aromatic group.

4. The element of claim 3 wherein $R^{15}$, $R^{16}$, $R^{17}$ and $R^{18}$ are selected from hydrogen, alkyl of 1 to 4 carbon atoms, alkylene or 1 to 4 carbon atoms, or phenyl, and $X^1$ is selected from

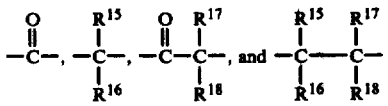

5. The element of claim 1 wherein said heterocyclic is selected from formula (1) and X is selected from:

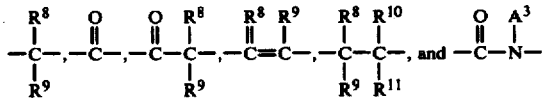

wherein $R^8$, $R^9$, $R^{10}$, and $R^{11}$ are independently hydrogen, alkyl group of 1 to 4 carbon atoms, cycloalkyl group of 3 to 6 carbon atoms, and phenyl group of 6 to 12 carbon atoms, and $A^3$ is an alkoxyalkyl group as defined for $A^1$ and $A^2$.

6. The element of claim 5 wherein

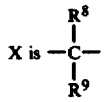

and $R^8$ and $R^9$ are hydrogen or alkyl of 1 to 4 carbon atoms and $R^2$ is hydrogen.

7. The element of claim 6 wherein

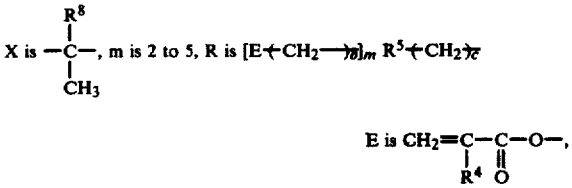

and $R^5$ is alkylene of 1 to 15 carbon atoms.

8. The element of claim 1 wherein said polymer layer is further derived from 70 to 10% by weight of acrylates copolymerizable with said plyacryloyl containing heterocyclic.

9. The element of claim 6 wherein said polymer layer is further derived from 70 to 10% by weight of acrylates copolymerizable with said polyacryloyl containing heterocyclic.

10. The elements of [claims] *claim* 3[, 4, 5, 6, 7, 8, or 9] in which said information carrying element comprises a disc having a circular pattern of grooves with information-carrying deformities in the form of modulations, depressions or protuberances wherein the depth or height of the information-carrying deformities from the mean height of the surface is between 0.03 and 2 μm and said separate layer is between 1 and 25 μm in its maximum thickness.

*11. The elements of claim 4 in which said information carrying element comprises a disc having a circular pattern of grooves with information-carrying deformities in the form of modulations, depressions or protuberances wherein the depth or height of the information-carrying deformities from the mean height of the surface is between 0.03 and 2 μm and said separate layer is between 1 and 25 μm in its maximum thickness.*

*12. The elements of claim 5 in which said information carrying element comprises a disc having a circular pattern of grooves with information-carrying deformities in the form of modulations, depressions or protuberances wherein the depth or height of the information-carrying deformities from the mean height of the surface is between 0.03 and 2 μm and said separate layer is between 1 and 25 μm in its maximum thickness.*

*13. The elements of claim 6 in which said information carrying element comprises a disc having a circular pattern of grooves with information-carrying deformities in the form of modulations, depressions or protuberances wherein the depth or height of the information-carrying deformities from the mean height of the surface is between 0.03 and 2 μm and said separate layer is between 1 and 25 μm in its maximum thickness.*

*14. The elements of claim 7 in which said information carrying element comprises a disc having a circular pattern of grooves with information-carrying deformities in the form of modulations, depressions or protuberances wherein the depth or height of the information-carrying deformities from the mean height of the surface is between 0.03 and 2 μm and said separate layer is between 1 and 25 μm in its maximum thickness.*

*15. The elements of claim 8 in which said information carrying element comprises a disc having a circular pattern of grooves with information-carrying deformities in the form of modulations, depressions or protuberances wherein the depth or height of the surface is between 0.03 and 2 μm and said separate layer is between 1 and 25 μm in its maximum thickness.*

*16. The elements of claim 9 in which said information carrying element comprises a disc having a circular pattern of grooves with information-carrying deformities in the form of modulations, depressions or protuberances wherein the depth or height of the surface is between 0.03 and 2 μm and said separate layer is between 1 and 25 μm in its maximum thickness.*

* * * * *